(12) United States Patent
Marshall

(10) Patent No.: US 6,234,043 B1
(45) Date of Patent: May 22, 2001

(54) PERFORMANCE ENHANCING HANDLEBARS FOR CYCLISTS

(76) Inventor: Brian Marshall, 1516 Cliffview Dr., Salem, VA (US) 24153

( * ) Notice: Subject to any disclaimer, the term of this patent is extended or adjusted under 35 U.S.C. 154(b) by 0 days.

(21) Appl. No.: 09/132,460

(22) Filed: Aug. 12, 1998

(51) Int. Cl.[7] .................................................. B62K 21/12
(52) U.S. Cl. ........................................ 74/551.8; 74/551.3
(58) Field of Search ............................... 74/551.8, 551.1, 74/551.3, 551.4, 551.6; D12/178

(56) References Cited

U.S. PATENT DOCUMENTS

| | | | |
|---|---|---|---|
| 5,138,893 | * | 8/1992 | Copeland .......................... 74/551.8 X |
| 5,163,339 | * | 11/1992 | Giard, Jr. et al. .............. 74/551.8 X |
| 5,209,508 | * | 5/1993 | Lennon ............................ 74/551.8 X |

FOREIGN PATENT DOCUMENTS

4336485 * 6/1994 (DE) ..................................... 74/551.1

395697 * 7/1933 (GB) .................................. 74/551.3

* cited by examiner

*Primary Examiner*—Mary Ann Battista
(74) *Attorney, Agent, or Firm*—Robert E. Bushnell, Esq.

(57) ABSTRACT

Handlebars are either attached or integrally formed with to the crosspiece of a conventional handlebar, to allow a cyclist to grip the handlebar with both hands in a lower position relative to the crosspiece and with both hands spaced closely together to the frontal profile of the cyclist. This allows for a reduction in wind resistance and thus, enhances the speed of the bicycle while reducing the amount of effort necessary to maintain the bicycle at a given speed. The handlebars enable a cyclist to have greater control over a bicycle because the hand grip portion of the handlebars turn outward from the centerline of the bicycle. To further enhance comfort, the handlebars may be designed to have a rotatable or extendable upper portion, thus allowing the handlebar to be tailored to an individual's body or preference.

68 Claims, 16 Drawing Sheets

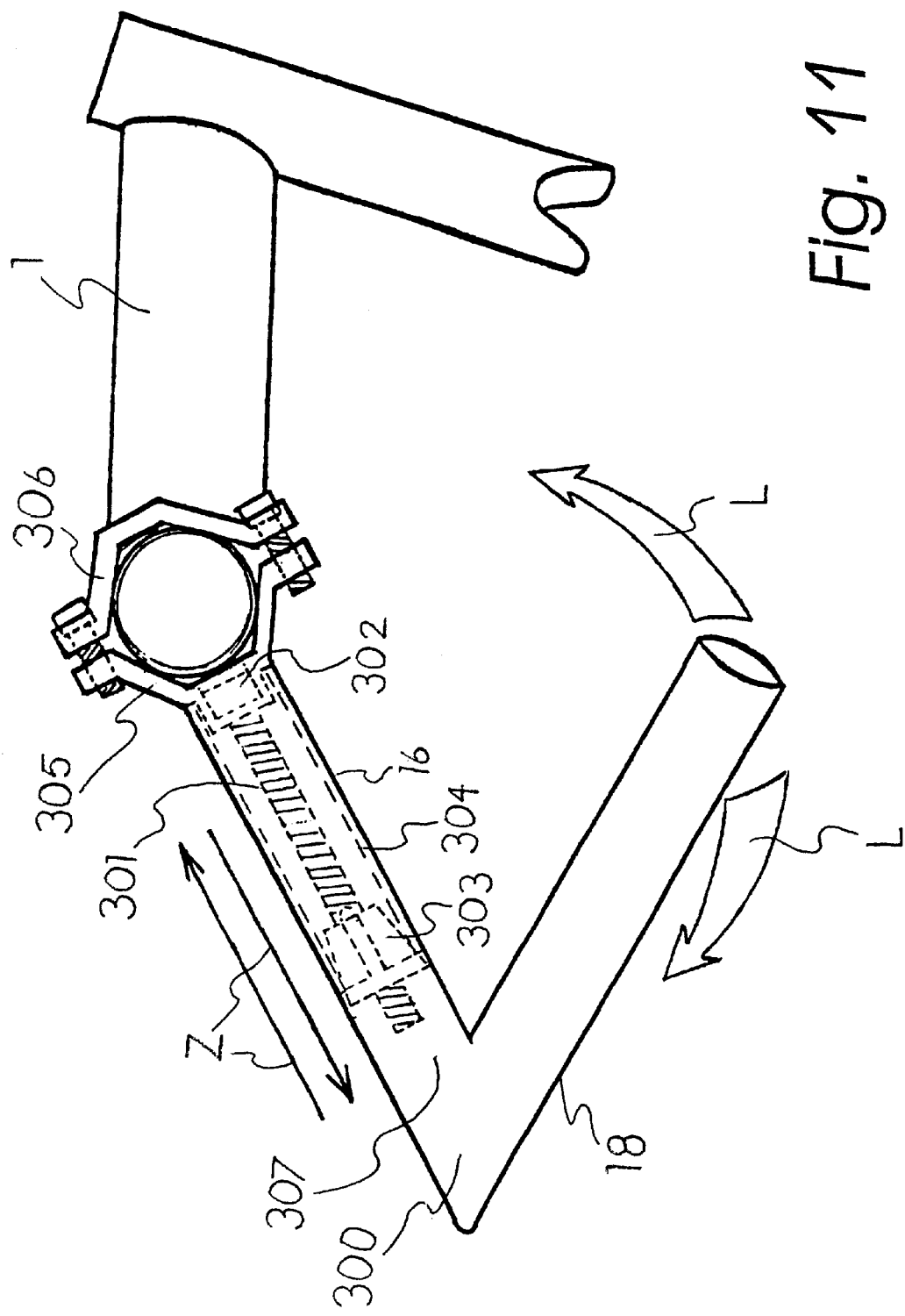

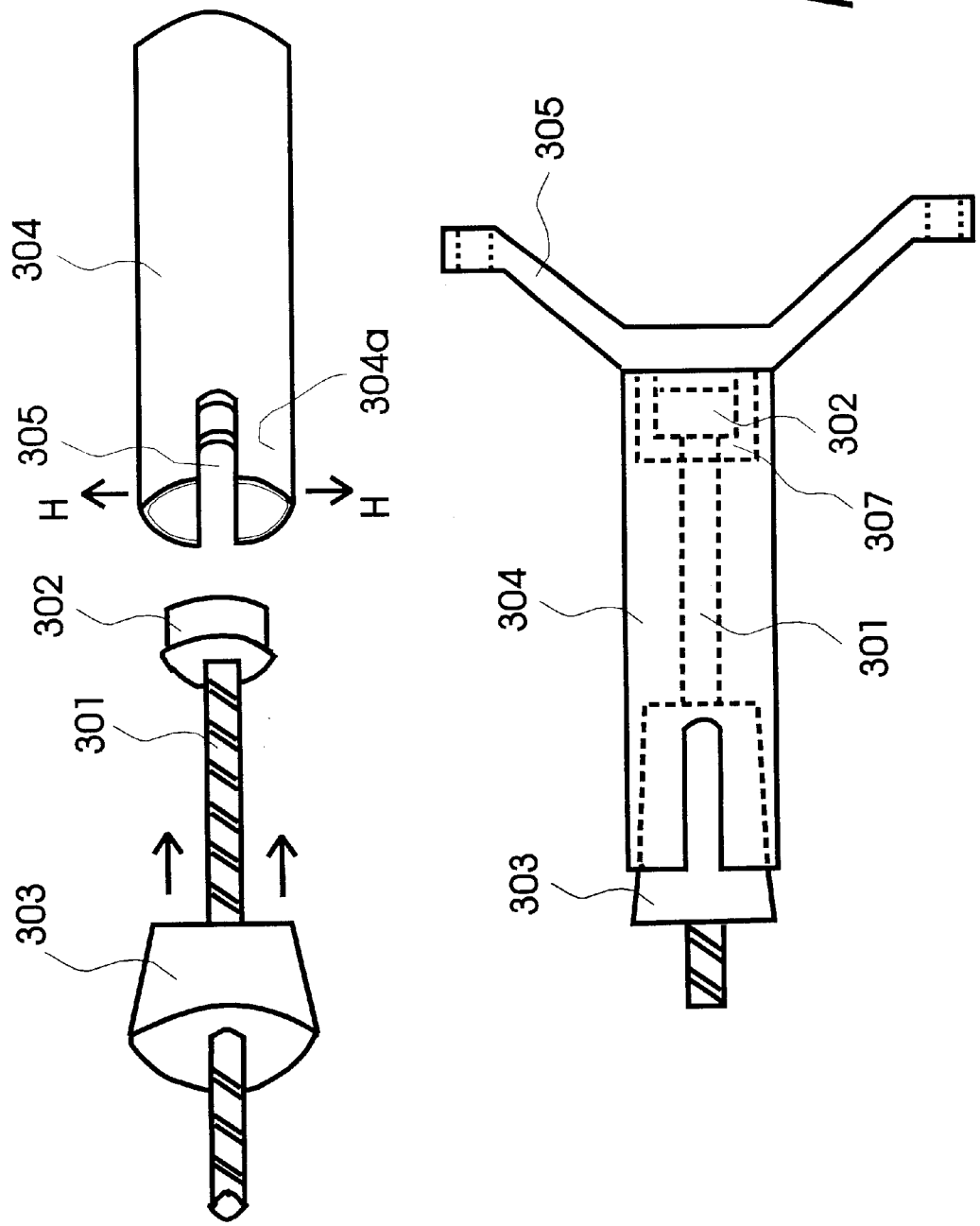

PERFORMANCE ENHANCING HANDLEBARS FOR CYCLISTS

BACKGROUND OF THE INVENTION

1. Field of the Invention

The present invention relates to handlebars for a bicycle and, more specifically, to performance enhancing handlebars for bicycles.

2. Background Art

In an attempt to improve bicycle performance, manufacturers are designing handlebars that allow cyclists to maximize speed while still allowing the cyclist enough control over a bicycle to navigate difficult courses. The complexities of bicycle design make it difficult to readily assess the merits of a new design without observing the bicycle during racing conditions. Even minor structural changes can sometimes yield significant performance advantages, that result in a concomitant increase in the cyclist's performance.

One of the largest factors in increasing speed is to reduce wind resistance by minimizing the cyclist's frontal profile. To reduce the frontal profile many cyclists lean their upper body forward while riding. This can be quite fatiguing, however, when a bicycle is not designed to allow a cyclist to comfortably maintain a leaning forward position.

To allow cyclists to comfortably lean forward while riding various techniques have been developed. For example, U.S. Pat. No. 4,750,754 to Lennon entitled *Bicycle and Handlebar system* mentions an over the top type of handlebar. The Lennon '754 handlebars have a second set of handles located in front of the regular handlebar. This allows one to rest one's forearms on pads located on a crosspiece and then grasp the second set of handles that are located further in front of the crosspiece. This causes the bicycler to adopt a lower overall position that reduces the front profile. U.S. Pat. No. 4,878,397 to Lennon entitled *Bicycle, Handlebar and Adapter System* discusses a handlebar system similar to that of Lennon '754 except that the second set of handlebars form a closed loop with the primary handlebars. Some cyclists have found that these handlebars are unsteady in comers or when making sudden turns. This has led to some racing events disallowing the use of over the top type handlebars.

To try to improve the handling and control of bicycles handlebars were developed that allowed the cyclist to adopt a lower center of gravity while riding. For example, U.S. Pat. No. 5,209,508 to Lennon entitled *Bicycle, Handlebar and Adapter System* mentions handlebars that are a variant of the type used on a typical ten speed bike. These handle bars have lateral portions underneath the crosspiece of the handlebar to allow a lower gripping position for a cyclist. The lateral portions can interfere with a cyclist during the operation of a bicycle due to collisions between the cyclist's legs and the lateral portions. In addition, Lennon '508 discloses an inner lower drop loop that can be attached to the crosspiece of the handlebars. This allows one to place one's hands in a lower inside position that is either parallel to or perpendicular to the crosspiece of the handlebars.

The idea of positioning a cyclist's hands in a lower and central position was further refined in U.S. Pat. No. 5,138, 893 to Copeland entitled *Bicycle Handlebar Handgrip Adapter System* that mentions a pair of hand grips that provide a lower and inner gripping position for a cyclist. The lower ends of the adapter handlebars extend inwards from both the point of connection between the adapter and the primary handlebars and from the upper portion of the adapter handlebars.

The contemporary art still needs handlebars that facilitate top performance while providing as much control as possible to avoid the dangerous situations where a cyclist crashes a bicycle while seated in the vulnerable forward leaning position. I believe that it may be possible to improve on the prior art by providing handlebars that allow a cyclist to enhance cycling performance, that reduce the cyclist's front profile, that have improved control to allow a cyclist to react to sudden changes in a course or to unexpected road hazards.

SUMMARY OF THE INVENTION

Accordingly, it is an object of the present invention to provide an improved handlebar system and an improved handlebar adapter.

It is another object to provide a handlebar system and a handlebar adapter that enables a cyclist to obtain enhanced performance from a bicycle.

It is still another object to provide a handlebar system and a handlebar adapter that reduce's a cyclist's front profile, thus reducing wind resistance and increasing the speed a cyclist can achieve while reducing the required effort to maintain the speed of cycling.

It is yet another object to provide a handlebar system and a handlebar adapter that provides a cyclist with improved control to facilitate the negotiation of sudden directional changes necessitated by an unfamiliar cycling route or by an unexpected road hazard.

It is still yet another object to provide a handlebar system and a handlebar adapter that is adjustable for cyclists of different sizes.

It is a further object to provide a handlebar system and a handlebar adapter that is adaptable for a wide variety of handlebars and bicycles.

It is a still further object to provide a handlebar system and a handlebar adapter that allows a cyclist to counter steer a bicycle more effectively, thus increasing the cyclists ability to control the bicycle and to 'sense' how stable the bicycle is during any given maneuver.

It is still yet a further object to provide a handlebar system and a handlebar adapter that allows a cyclist to rotate the handlebars laterally to adjust for minute differences in a cyclist's physique.

To achieve these and other objects, a handlebar adapter is provided. Alternatively, the handlebar adapters can be constructed with the primary handlebars to provide an integrated handlebar system. The handlebar adapter, regardless of whether it is a separate unit or part of a handlebar system, will hereinafter be referred to as "handlebars". The handlebars are attached to the crosspiece of a conventional handlebar to allow a user to grip the handlebar in a lower position with both hands spaced closely together to facilitate minimizing the frontal profile. This allows for a reduction in wind resistance and thus, enhances the speed of the bicycle while reducing the amount of effort necessary to maintain the bicycle at a given speed.

The handlebars enable a cyclist to have greater control over a bicycle because the hand grip portion of the handlebars turn outward from the centerline of the bicycle rather than inward, as do typical adapters. This change in the alignment of the hand grip portion of the handlebars allows for superior control and handling of the bicycle due to the handlebars aiding the cyclists upper body in aligning in a fashion that makes controlling the bicycle easier.

While any set of handlebars that were massed produced may be slightly uncomfortable for a particular user, a second embodiment of the present invention provides handlebars that can be rotated about a threaded stem or telescopically extended. This allows the handlebars to be slightly adjusted to accommodate the preferences of individual users.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 11 illustrates one of a set of handlebars as constructed according to a second embodiment of the present invention, this embodiment is capable of lateral rotation to accommodate a user's preference;

FIG. 12 illustrates salient components of the handlebar of FIG. 11;

DETAILED DESCRIPTION OF THE DRAWINGS

Figure 1:
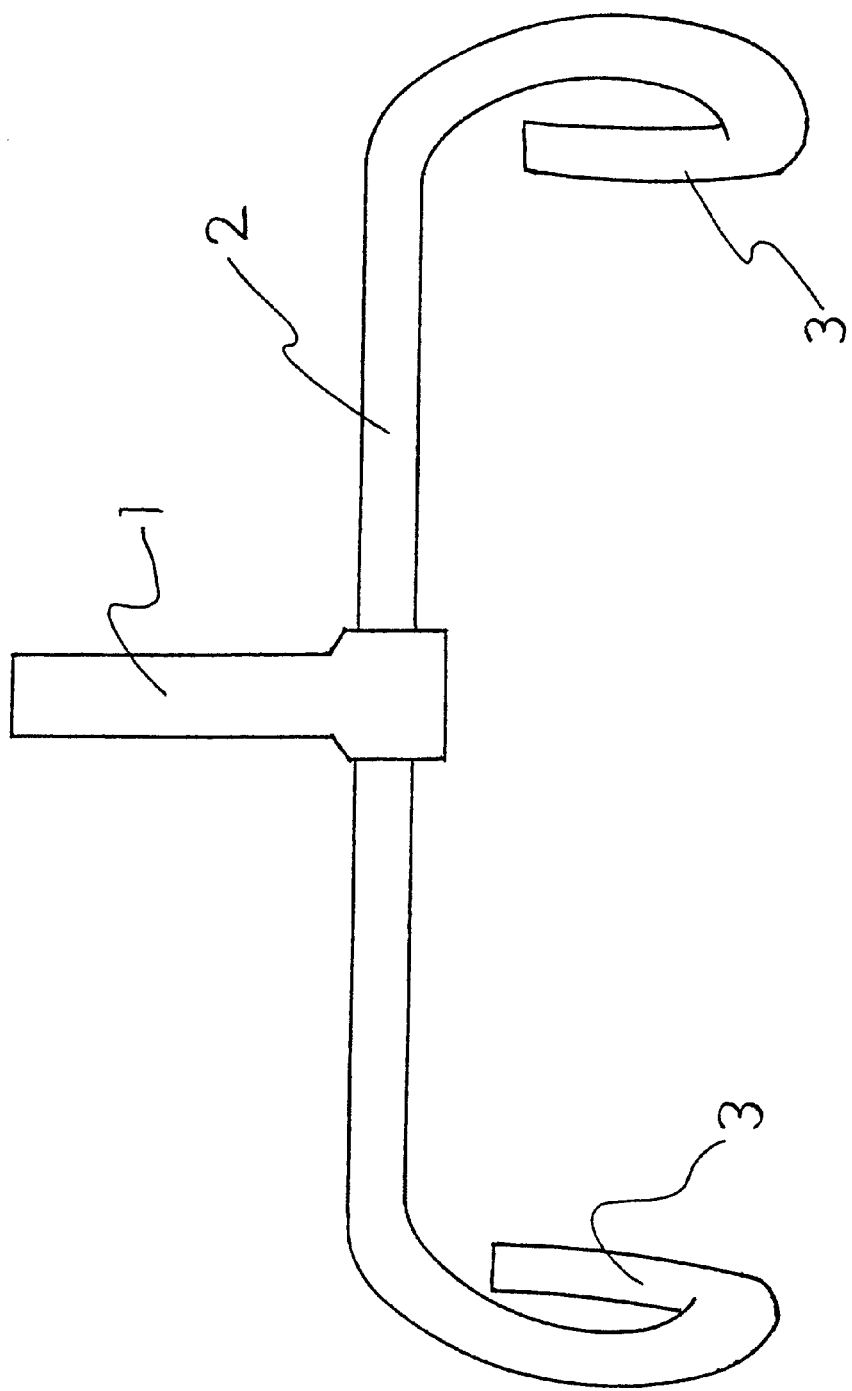
FIG. 1 is a top view of a primary handlebar.
Figure 2:
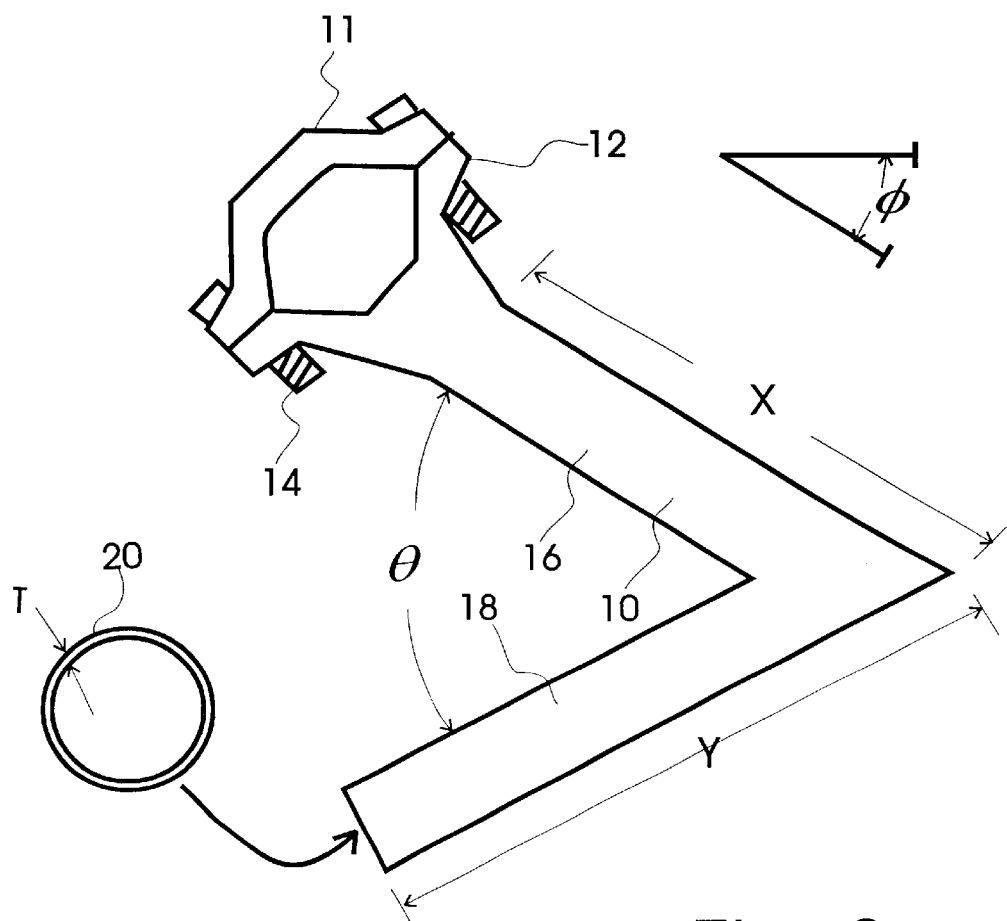
FIG. 2 is a side view of one of a set of handlebars as constructed according to the principles of the present invention.

Turning now to the drawings, FIG. 1 illustrates a primary handlebar that may be constructed using stem 1 to attach crosspiece 2 to a bicycle. Hand grips 3 are attached to opposite ends of crosspiece 2 and are used by cyclists to maintain balance and position while traveling on the bicycle. The primary handlebar is the handlebar that originally is manufactured for use with the associated bicycle. The inventive handlebars, one of which is shown in FIG. 2, can be attached to the primary handlebar as an adapter for use as an after-market add-on. Alternatively, the inventive handlebars can be manufactured as an integral piece with the primary handlebar during the manufacturing of the bicycle.

Referring to FIG. 2, handlebar 10 may be manufactured either as an adapter for other handlebars, such as the handlebar shown in FIG. 1, or as an integral part of a handlebar system. When handlebar 10 is used as an adapter for other handlebars, it is attached to the crosspiece 2 of the other handlebar. One handlebar 10 is attached to the crosspiece on either side of the stem. By spacing the handlebars 10 close together, the aerodynamics of the cyclist can be improved. The outward turn of handlebars 10 of the present invention allows the handlebars to be placed closer together thus allowing the rider to position his hands closer together and improve the overall aerodynamics of the cyclist. The close hand position creates a cone shaped air deflector. This deflector directs air to the right and to the left of the cyclist and away from both the air pocket created by the body trunk and away from the turbulence created by the movement of the upper legs. The deflected air is pushed up and over the shoulders of the cyclist and below the upper legs of the cyclist.

As further shown by FIG. 2, handlebar 10 has upper bracket 11 that mates with lower bracket 12 to secure the handlebar around the crosspiece 2 of another handlebar. While the handlebar shown in FIG. 2 is meant to be put on as an adapter to a primary handlebar, handlebar 10 can be formed integrally with a primary handlebar, similar to the primary handlebar depicted in FIG. 1, by using either a molding or casting process. Handlebar 10 has upper-portion 16 and hand-grip-portion 18. Hand-grip-portion, or handle, 18 as viewed from the side, makes an angle, denoted by $\theta$ with upper portion 16 in the range of about approximately 45 degrees to approximately about 80 degrees. $\theta$ is also referred to as the grip angle. The grip angle is more preferably within the range of approximately about 50 degrees to approximately about 70 degrees. A grip angle of around 63 degrees offers a desirable compromise between control and comfort. Bar angle $\phi$ represents the angle between upper-portion 16 and a plane parallel to the ground supporting the bicycle. Bar angle $\phi$ is in the range of approximately about 5 degrees to approximately about 45 degrees. A preferable bar angle $\phi$ is about 29 degrees. 'X' denotes the upper length of upper-portion 16, that may be designed to be in the range of approximately about 3 inches to approximately about 11 inches, with a preferred length of about 6.188 inches. 'Y' denotes the lower length of hand-grip-portion 18, that may be designed in the range of approximately about 3 inches to approximately about 11 inches, with a preferred length of about 6.5 inches.

Figure 3:
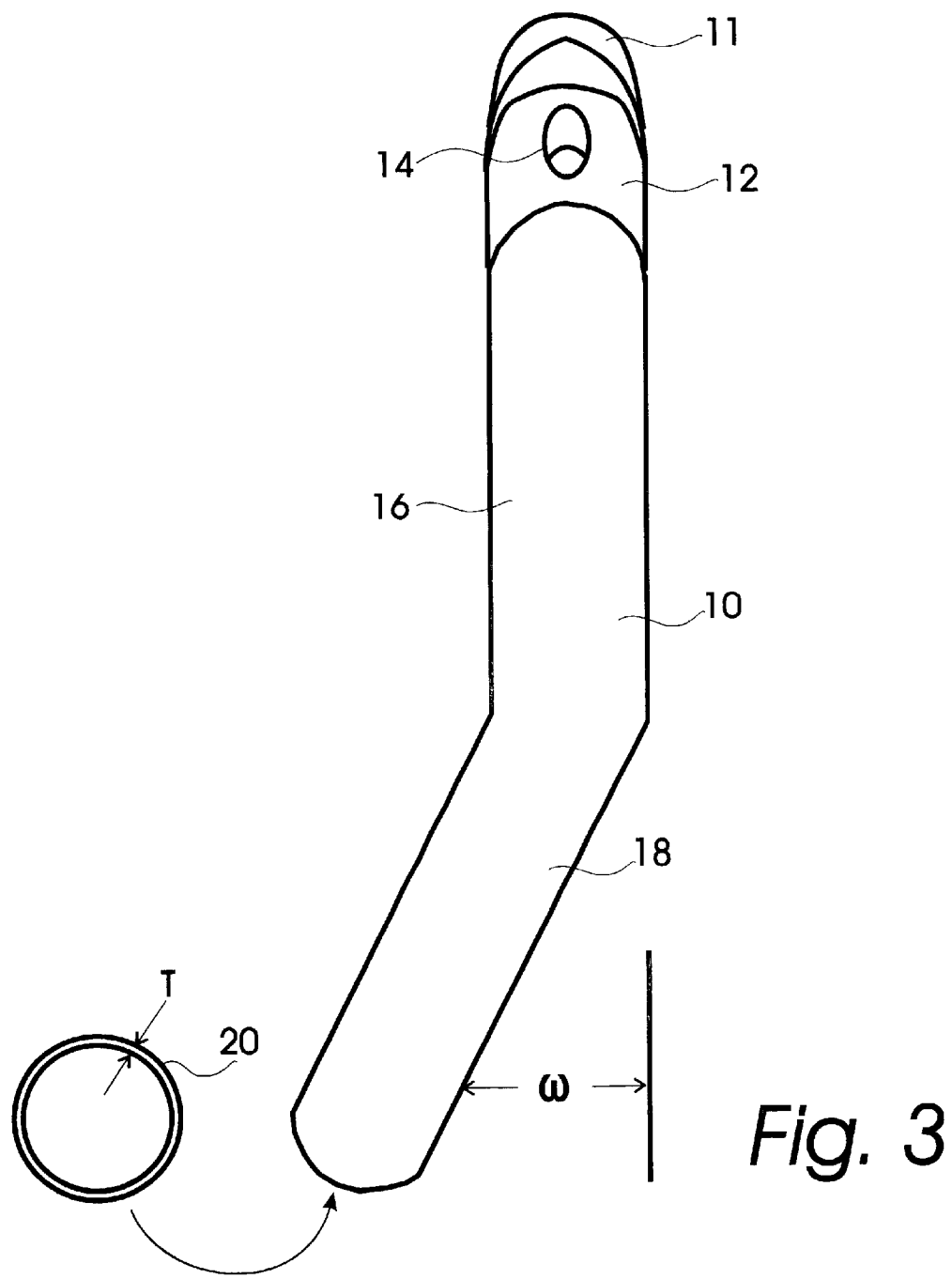
FIG. 3 is a front view of the handlebar of FIG. 2 that is grasped by a cyclists right hand.

Referring to FIG. 3, the handlebar shown is gripped by the right hand of the cyclist. Upper bracket 11 combines with lower bracket 12 to enclose the crosspiece of a primary handlebar and are fastened together using fastener 14. Upper-portion 16 of handlebar 10, when viewed from the front, forms a control angle, denoted as $\phi$ in FIG. 3, with hand-grip-portion 18. Control angle $\phi$ is in the range of approximately about 5 degrees to approximately about 45 degrees, with a preferred range of about 25 degrees. The handle may be formed using a hollow tubular material as shown by cross-section 20. The thickness 't' of the tube depends on the material properties of the material used to make handlebar 10. The handlebars can be formed of any one of an alloy, steel, and composite. Thickness t can range from approximately about 0.02 inches to approximately about 0.2 inches, with a preferred thickness of about 0.055 inches.

Figure 4:
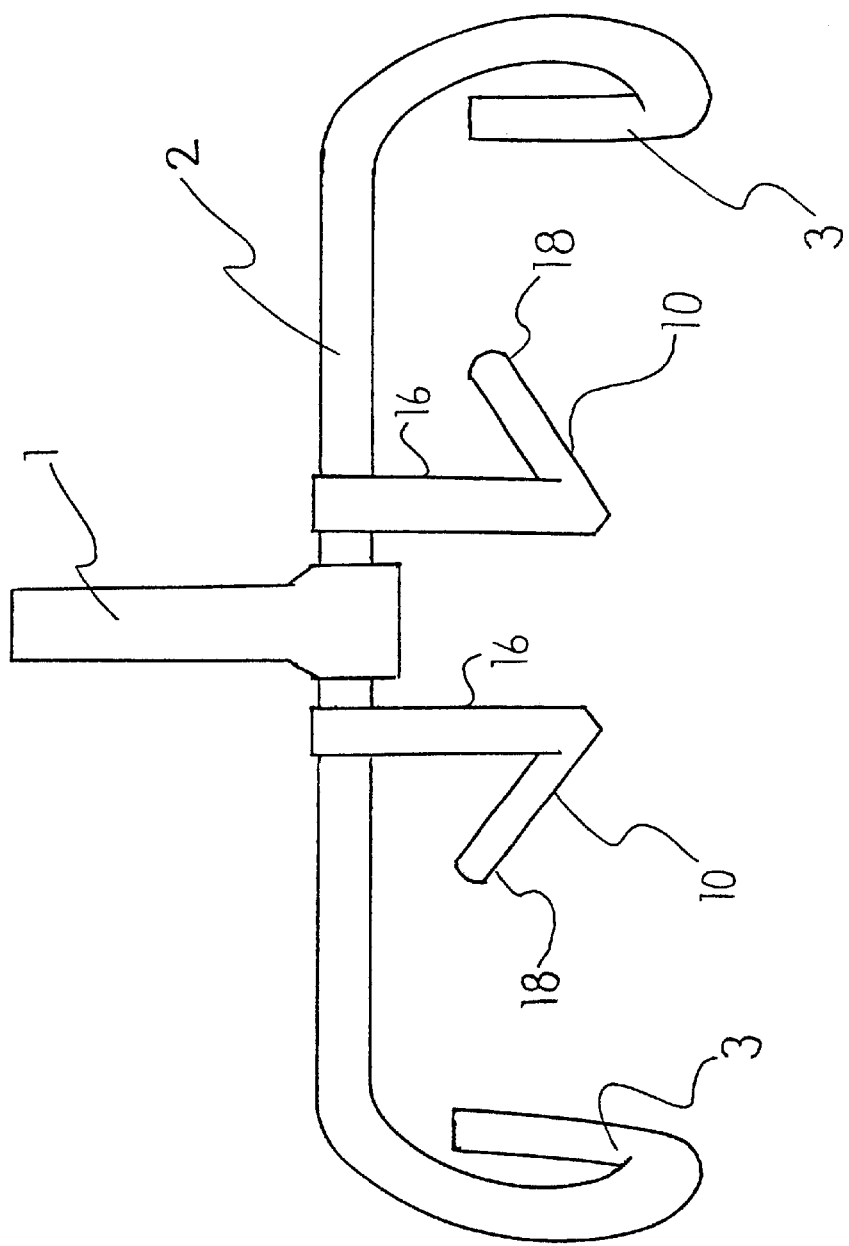
FIG. 4 is a top perspective view of the handlebars of FIG. 2 attached or formed with a primary handlebar.

Referring to FIG. 4, when a cyclist is climbing a hill, the cyclist tends to sit up straighter and places his/her hands on the top of the bicycles primary handlebars so he/she can apply more power to the peddles. This is often necessary because of the lower revolutions per minute condition that a bicycle undergoes while traversing steep inclines. Traditional over the top type of handlebars take up a lot of space on the primary handlebar of the bicycle, thus over the top type of handlebars are less convenient than the handlebars of the present invention while a cyclist is climbing steep hills. In addition, because handlebars 10 bend outwards, the handlebars can be spaced closer together around the stem of the bicycle, thus making it simpler to hold the top of the primary handlebar, while maintaining the hands in close proximity to each other, during a climbing situation.

Furthermore, traditional over the top handlebars have a higher center of gravity than the center of gravity of the handlebars of the present invention. When the rider stands up the high center of gravity of the over the top handlebars encourages the bicycle to undergo an oscillating side to side motion. To control this lateral oscillatory momentum, a cyclist has to use either his/her arms or legs, thus increasing the fatigue of climbing. In addition, handlebars 10 have a lighter weight than traditional over the top handlebars. The reduced weight further reduces the amount of fatigue a cyclist undergoes while climbing a steep hill. As such, handlebars 10 work very well for uphill bicycling situations.

Figure 5:
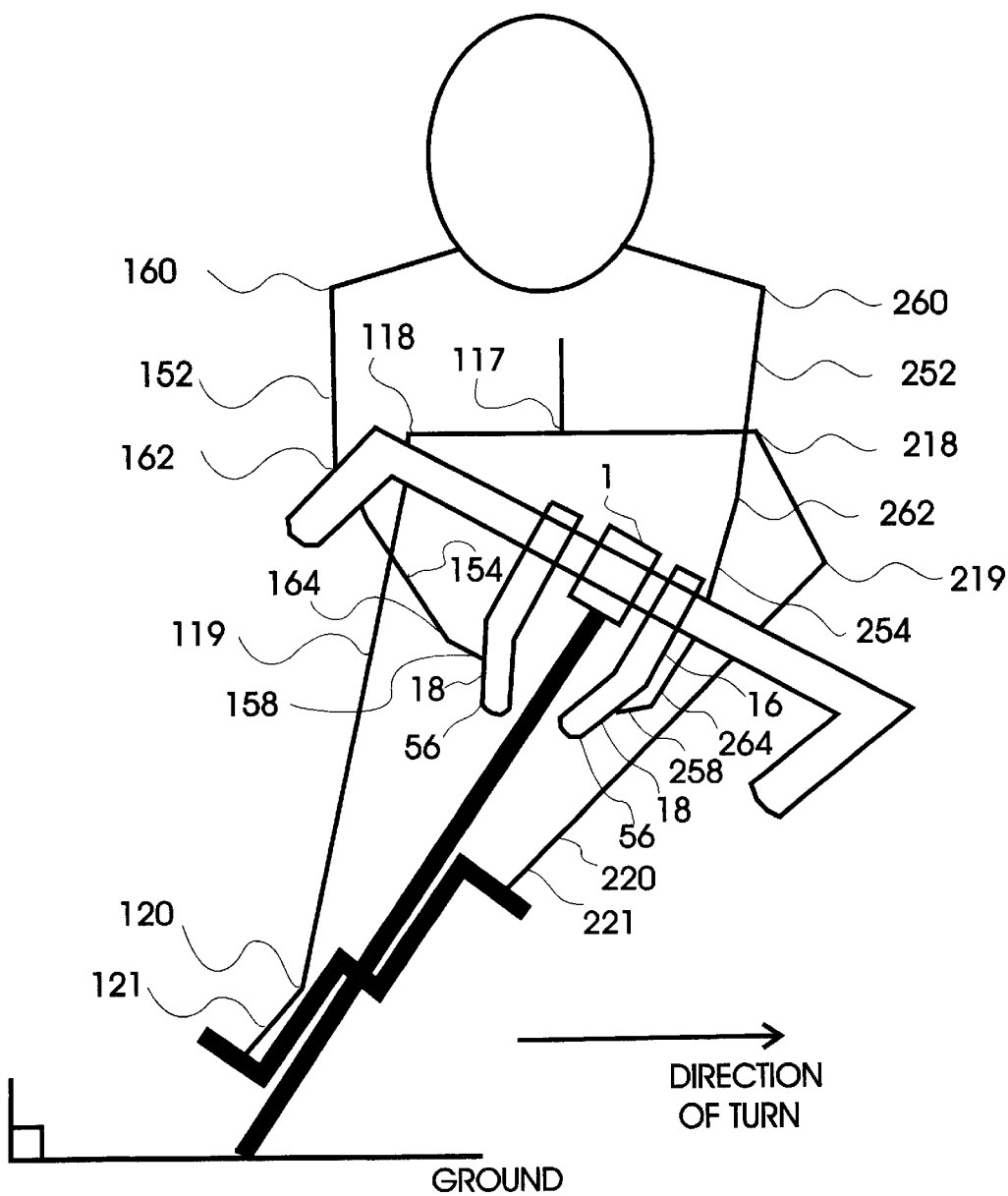
FIG. 5 is a schematic diagram of a cyclist making a turn using handlebars that have hand grip portions that turn inwards.
Figure 5A:
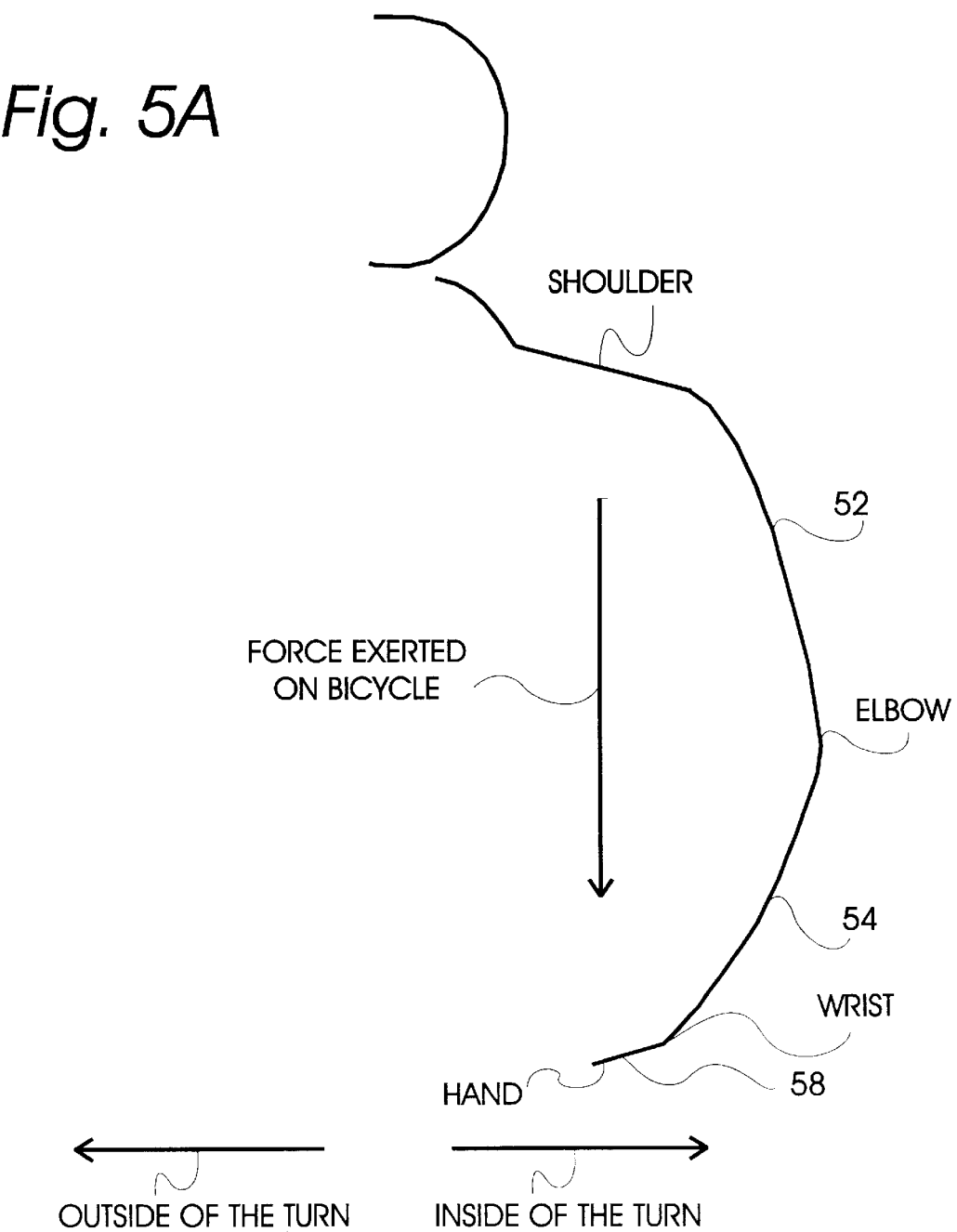
FIG. 5A is a schematic diagram emphasizing the arm position of a cyclist using the handlebars of FIG. 5 during a turn.

Referring to FIG. 5, hands 158 and 258 of the cyclist are bent towards inner forearm 154 and 254. This causes wrists 164 and 264 to be pushed forward and makes it difficult for the rider to exert a downward force. Handlebars 10 offer superior control during turning over handlebars 56, due to the outward bend of handlebars 10. As also shown in FIG. 5A, the arm of the cyclist on the inside of the turn is encouraged to adopt a U-shape. Having the hand bend inward to grasp handlebars 56 while needing to exert a force away from the trunk of the cyclist's body, is difficult. This makes it more difficult for a cyclist to perform the mechanics necessary to properly counter-steer a bicycle while executing various turns and maneuvers. For example, when turning the bicycle to the left, a cyclists right leg will be substantially straight to push the riders weight over the point of contact between the bicycle tires and the road. The faster a cyclist navigates a turn, the more radial forces tend to cause the bicycle to straighten up and flip towards the outside of the turn. To counter this, the cyclist exerts force with his/her left arm to force the bicycle to stay in the proper position to continue the turn. With hand 58 bending in the opposite direction from the direction that the force is being applied by upper arm 52 and forearm 54, it is more difficult for the cyclist to grasp the handlebars and harder to exert as powerful a force as would be otherwise generated if the hand bent towards the inside of the turn.

Figure 6:
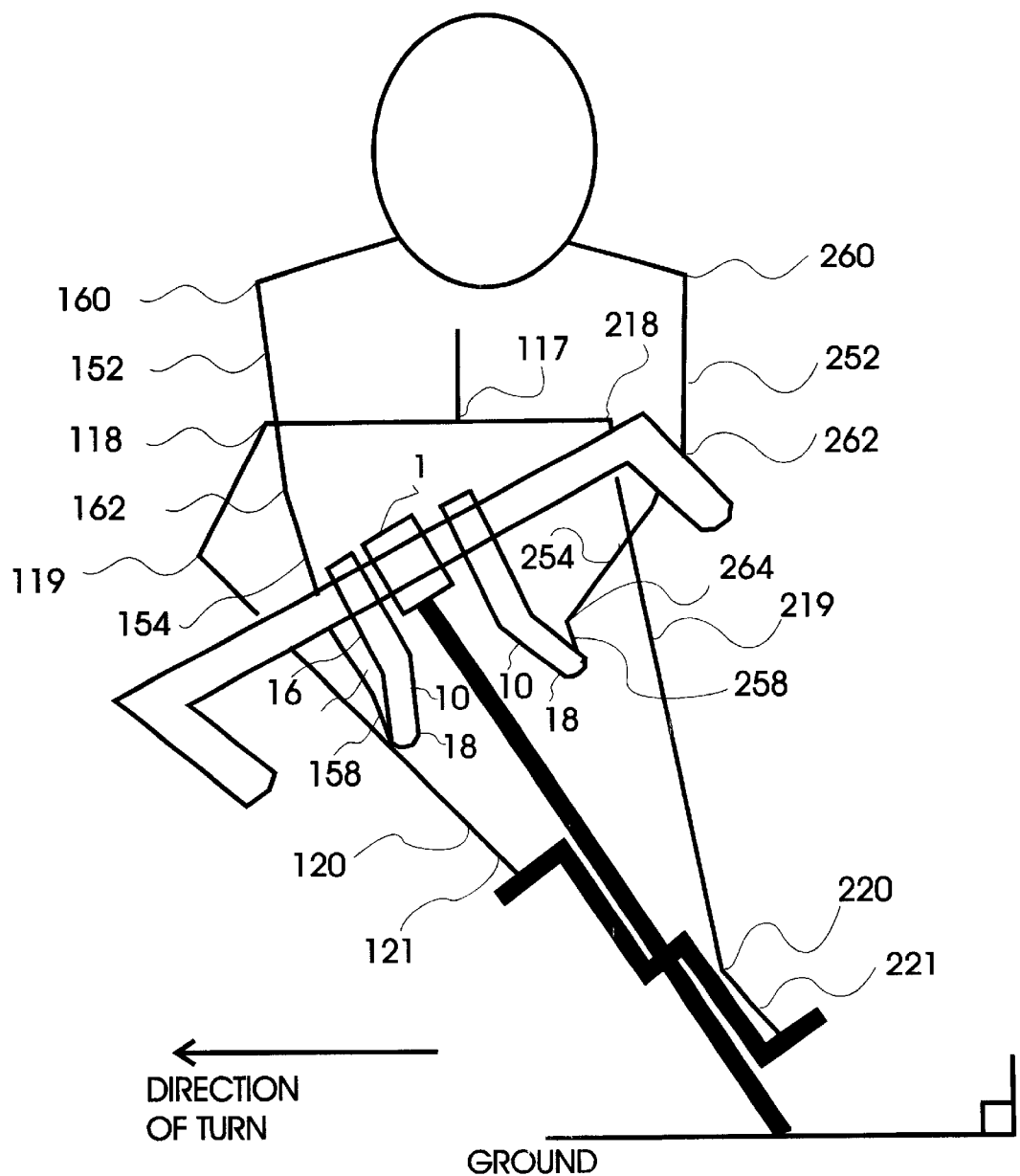
FIG. 6 is a schematic diagram of a cyclist using the handlebars of FIG. 2 while performing a right turn.
Figure 6A:
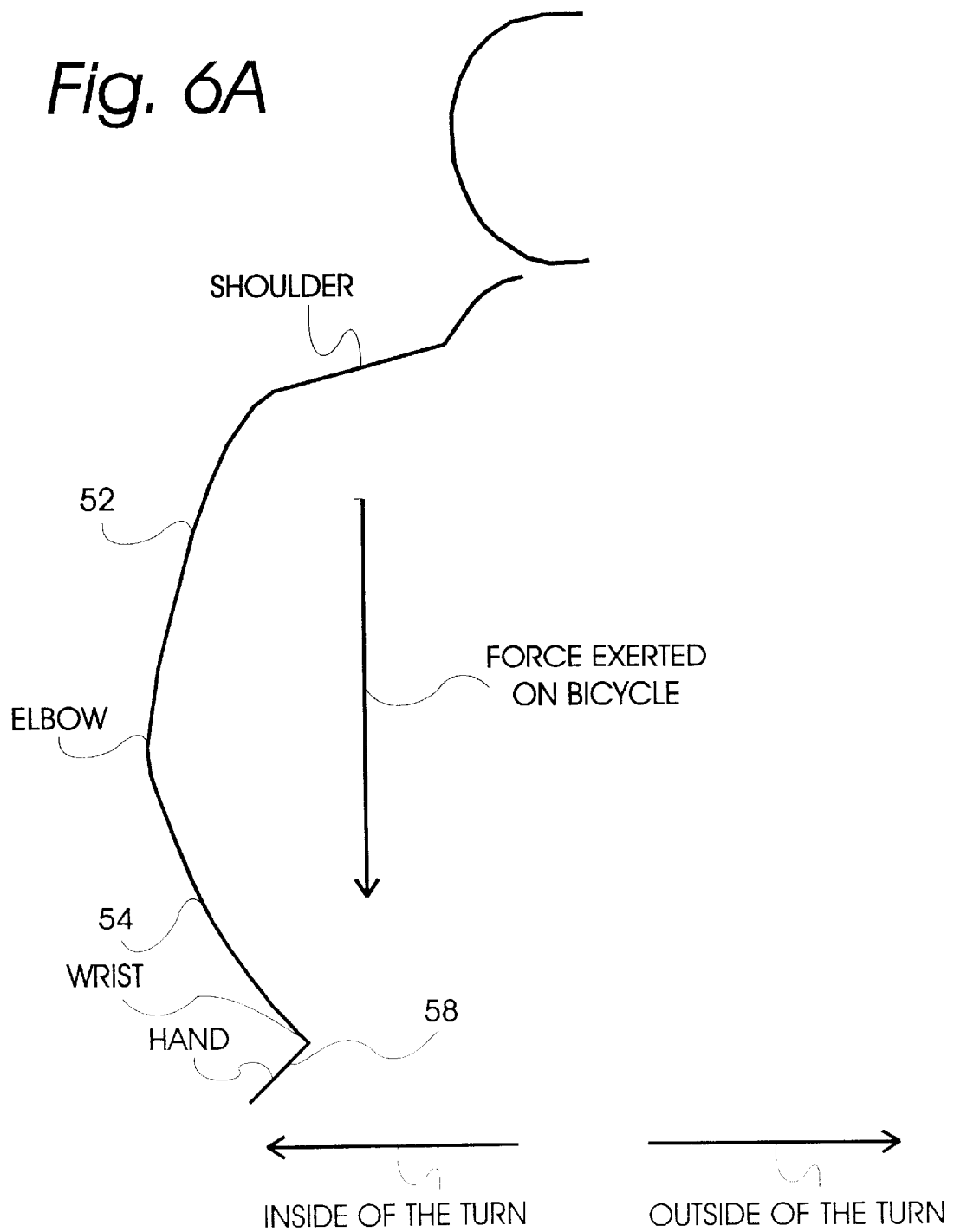
FIG. 6A is a schematic view emphasizing the arm position of a cyclist using the handlebars of FIG. 2 during a right turn.

Referring to FIG. 6, when the cyclist begins the right turn, his/her left leg is substantially straight, with left hip 218, left knee 219, ankle 220, and foot 221 in a relatively straight alignment, to push down to transfer weight over the contact point between the bicycle tires and the road. In addition, the right arm is substantially straight, thus helping to push the bicycle downwards and into position for the turn. The cyclist's right knee 119 is angled towards the inside of the turn, thus helping the cyclist stay in control of the bicycle. The faster a cyclist navigates a turn, the more radial forces tend to cause the bicycle to straighten up and flip towards the outside of the turn. To counter this, the cyclist exerts force with his/her right arm, including upper arm 152, forearm 154, and hand 158 being in a strong alignment, to force the bicycle to stay in the proper position to continue the turn. The position used by the cyclist positions the bicyclist's center of mass 117 closer being over the contact point between the bicycle's tires and the ground. As further emphasized in FIG. 6A, the handlebars of the present invention cause the hand to bend towards the inside of the turn, thus placing the wrist in a much more stable position to apply the force necessary to keep the bike in the proper alignment for completing the turn. The handlebars of the present invention keeps the wrist behind the hand relative to the ground, thus allowing a user to utilize the larger triceps muscle of the upper arm. If handlebars are used that bend inward, rather than outward, then the right arm will be in weaker orientation and it will be more difficult for the rider to maintain stability.

Figure 7:
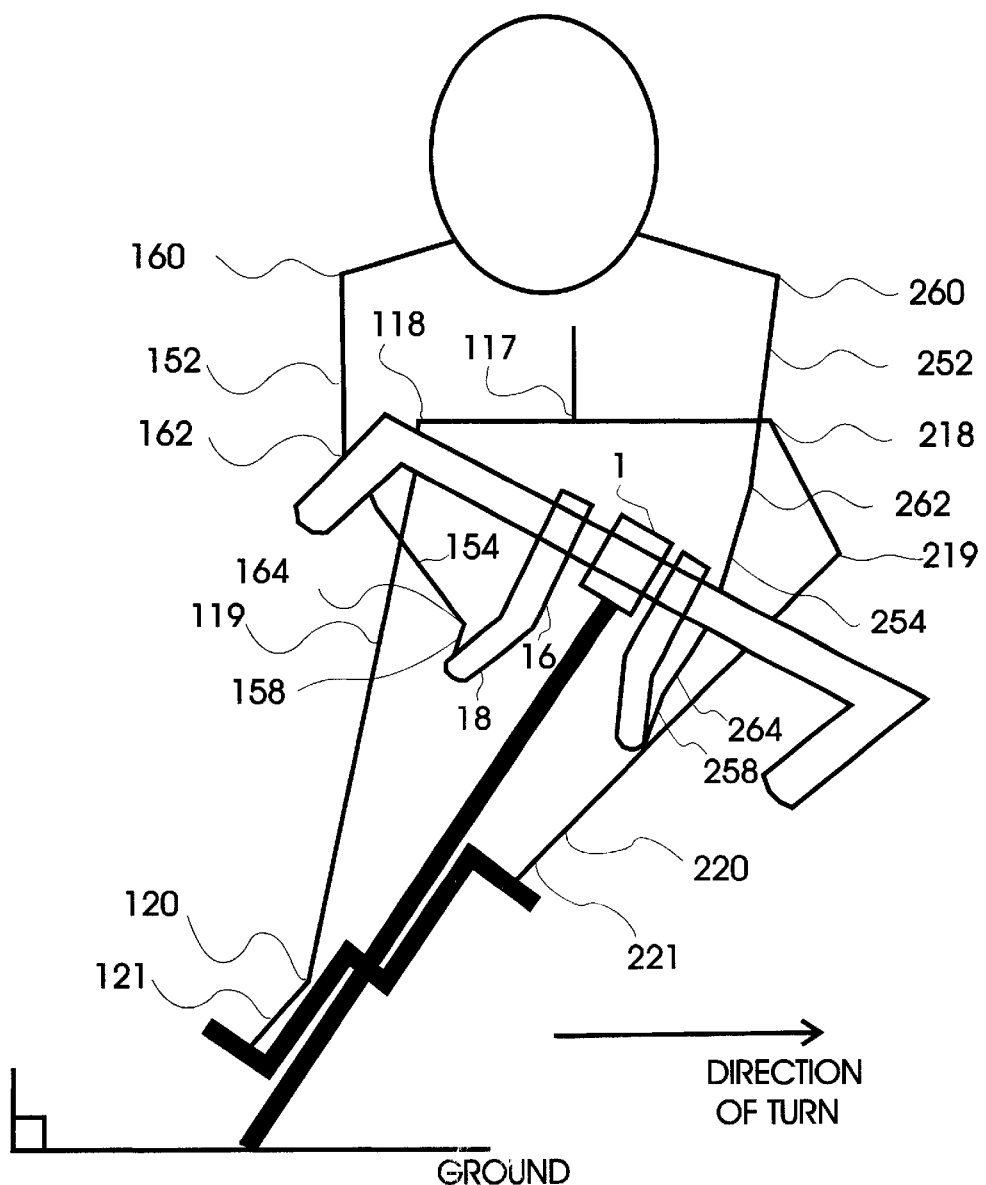
FIG. 7 is a schematic diagram front view of a cyclist using the handlebars of FIG. 2 during a left turn.

Referring to FIG. 7, when the cyclist begins the left turn, his/her right leg is substantially straight, placing his/her right hip 118, right knee 119, right ankle 120, and right foot 121 in a relatively straight alignment, to push down, to transfer weight over the contact point between the bicycle tires and the road. The faster a cyclist navigates a turn, the more radial forces tend to cause the bicycle to straighten up and flip towards the outside of the turn. To counter this, the cyclist exerts force with his/her left arm, positioning his/her left shoulder 260, left elbow 262, and left wrist 264 in a substantially straight alignment, to force the bicycle to stay in the proper position to continue the turn. Left hand 258 is rotated away from inner forearm 254, thus making it easier for the cyclist to exert a downward force while maintaining a strong grip on the handlebars. As further emphasized in FIG. 7A, the handlebars of the present invention cause the hand to bend towards the inside of the turn, thus placing the wrist in a much more stable position to apply the force necessary to keep the bike in the proper alignment for completing the turn.

Figure 8:
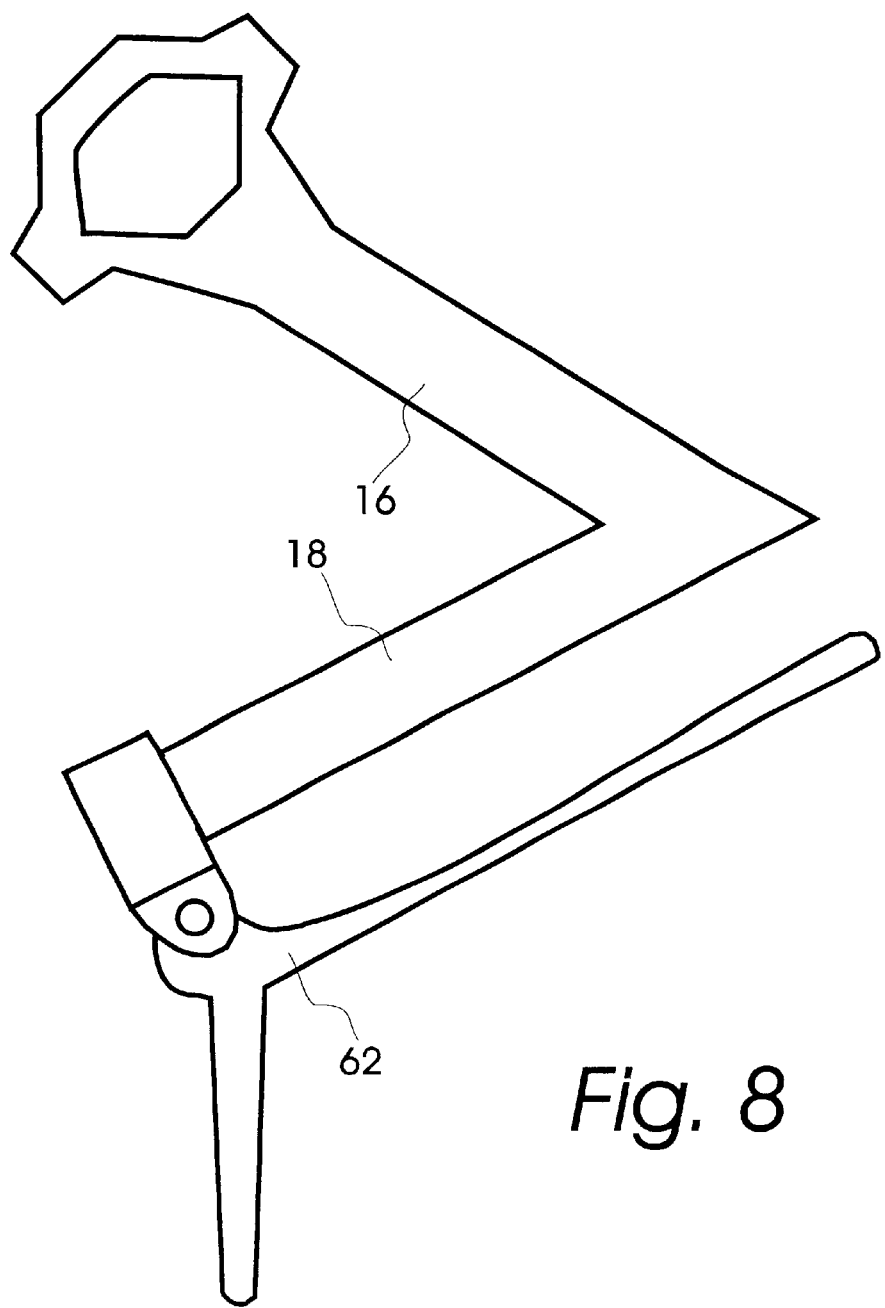
FIG. 8 is a side view of the handlebars of FIG. 2 with an attached hand brake.

Referring to FIG. 8, having the ability to mount a handle brake 62 on the handlebar makes it easier to brake in emergencies. By reducing the hand movement necessary to stop the bicycle, more precise control can be maintained over the bicycle.

Figure 9B:
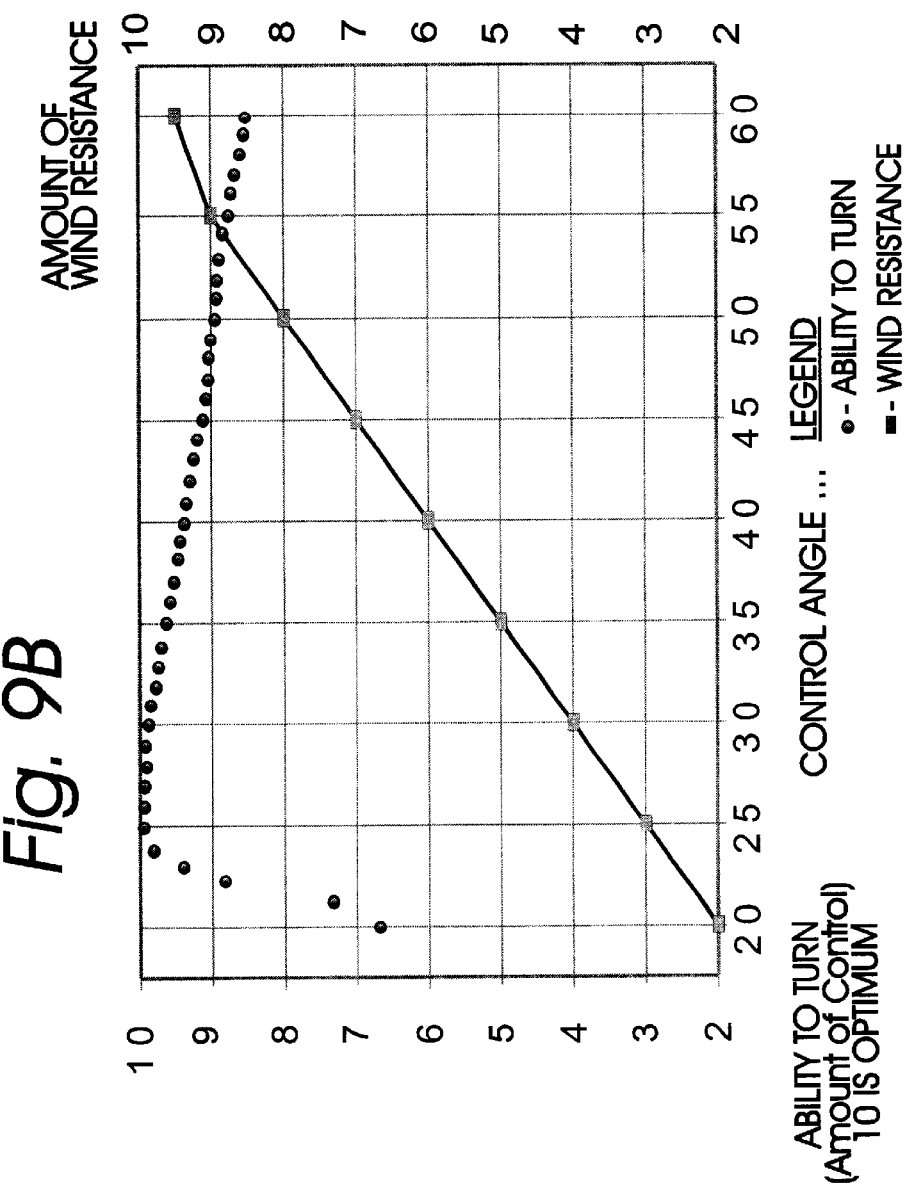
FIGS. 9A and 9B together form a graph illustrating both 'ability to turn vs. control angle' and 'wind resistance vs. control angle'.
Figure 9A:
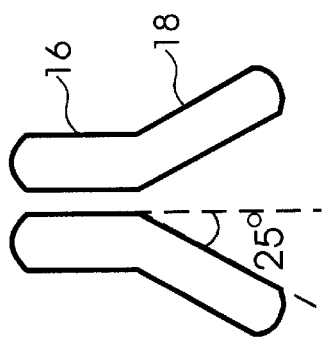
Figure 10B:
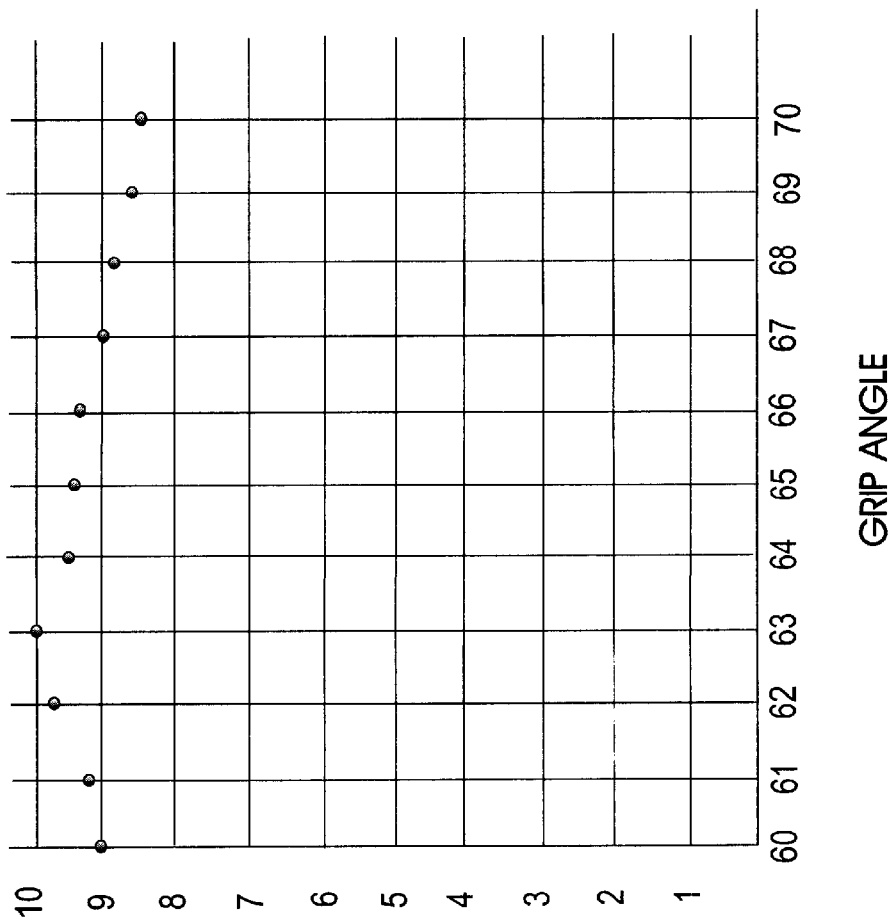
FIGS. 10A and 10B together form a graph illustrating 'wrist comfort vs. grip angle'.
Figure 10A:
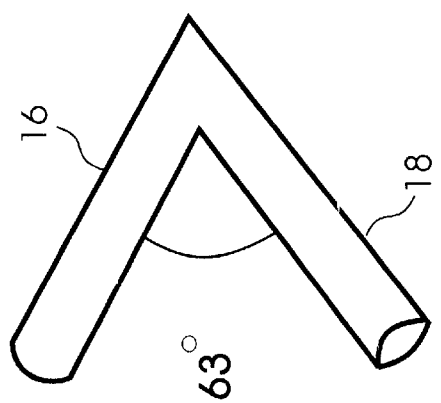

Referring to FIGS. 9A and 9B, the circle markers on the graph denote measurements of the cyclist's ability to turn the bicycle and the square markers denote the amount of wind resistance experienced by the cyclist. Measurement units are not provided for either wind resistance or ability to turn because the graph is only meant to suggest the relative value of one control angle versus another control angle of handlebars 10. The graph shows that at about an angle of 63 degrees, the comfort of the wrist is optimum. Again, measurement units are not provided for wrist comfort as the graph is meant to suggest the value of one grip angle relative to another in terms of wrist comfort.

Referring to a second embodiment shown in FIG. 11 and 12, handlebar 300 is laterally rotatable, in the directions denoted by arrows 'L', around threaded stem 301 to allow a user to adjust the handlebar position to accommodate an individual's taste or comfort. In addition, handlebar 300 is extendable to lengthen or shorten upper portion 307, by moving the handle in the directions denoted by arrows 'Z'. While the above disclosed angles and ranges for the first embodiment were found to be preferential, optimum placement of the hand-grip-portion of the handlebar will naturally vary slightly among different cyclists. Handlebar 300 has upper portion 307 that has a hollow center. Inside the hollow center is positioned inner tube 304, which is connected to lower bracket 305. Threaded stem 301 is rotatable by turning stem head 302 prior to attaching lower bracket 305 to upper bracket 306. When threaded stem 301 is rotated, stopper 303 is drawn upward towards bicycle stem 1, thus forcing inner tube 304 to expand and firmly secure the lateral position of handlebar 300. When stopper 303 enters end 304a of inner tube 304, slots 305 allow end 304a to expand in the direction denoted by arrows 'H'. Stem head 302 is seated in seating surface 307. To assemble the combination, the threaded stem and stem head are inserted through seating surface 307 in inner tube 304. Then, stopper 303 is attached to threaded stem 301. To expand end 304a of inner tube 304, stem head 302 is rotated, thus securing handlebar 300 in the desired position.

Figure 13:
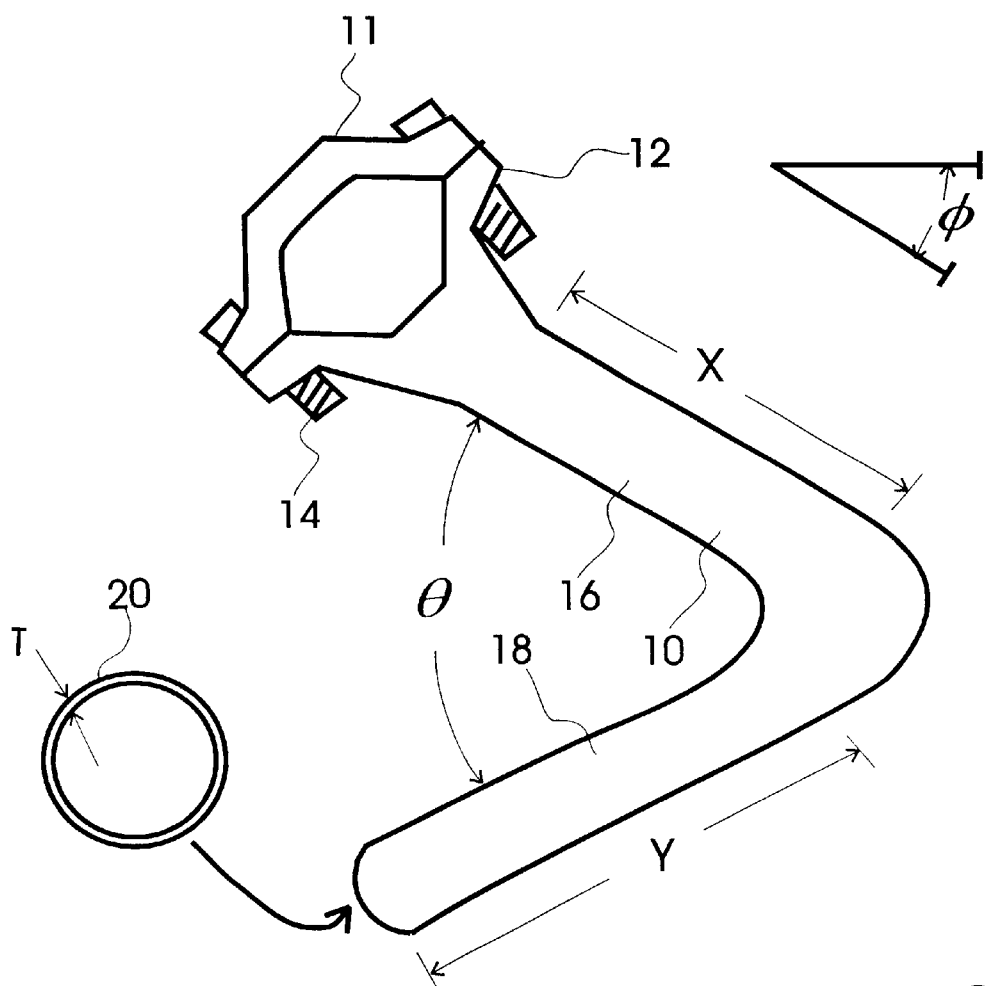
FIG. 13 illustrates a handlebar of either FIG. 11 or FIG. 2 to show an alternative shape for the handlebars of the present invention.
Figure 14:
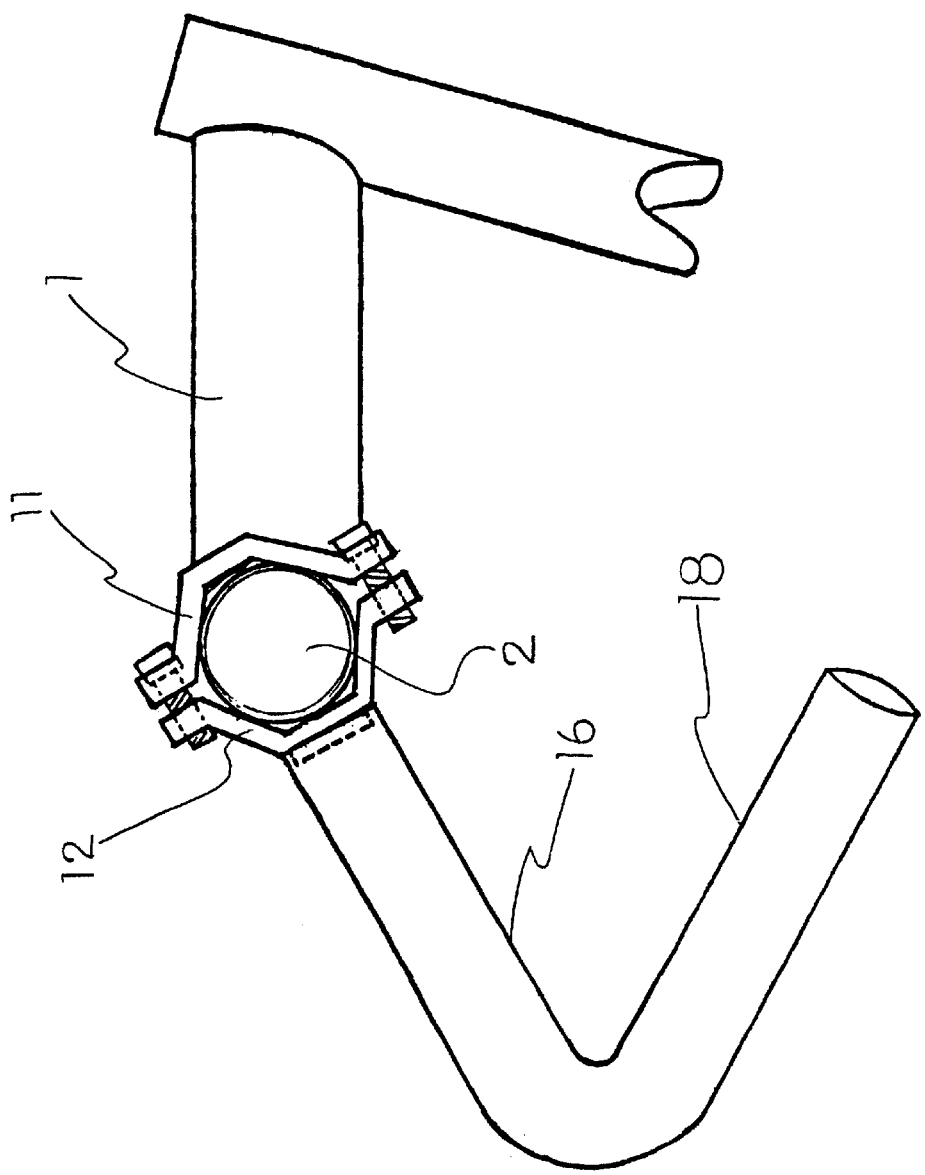
FIG. 14 illustrates the handlebar of FIG. 13 attached to a primary handlebar.

FIG. 13 shows another shape for the handlebar of the present invention. While either the first or second embodiment of the present invention can be designed using a gently bent tube. The handlebars using this shape still turn outwards, with only the preferred angles varying slightly, because of variance introduced by using a handlebar having a gentle bend. The ranges of the handlebar of FIG. 13 are the same as those detailed for FIG. 2. Handlebar 10 has upper bracket 11 that mates with lower bracket 12 to secure the handlebar around the crosspiece a primary handlebar. While the handlebar shown in FIG. 13 is meant to be put on as an adapter to a primary handlebar, handlebar 10 can be formed integrally with a primary handlebar, similar to the primary handlebar depicted in FIG. 1, by using either a molding or casting process. Handlebar 10 has upper-portion 16 and hand-grip-portion 18. Hand-grip-portion, or handle, 18 as viewed from the side, makes an angle, denoted by θ with upper-portion 16 in the range of about approximately 45 degrees to approximately about 80 degrees. θ is also referred to as the grip angle. The grip angle is more preferably within the range of approximately about 50 degrees to approximately about 70 degrees. A grip angle of around 58.5 degrees offers a desirable compromise between control and comfort. Bar angle φ represents the angle between upper-portion 16 and a plane parallel to the ground supporting the bicycle. Bar angle φ is in the range of approximately about 5 degrees to approximately about 45 degrees. A preferable bar angle φ is about 24.5 degrees. 'X' denotes the upper length of upper-portion 16, that may be designed to be in the range of approximately about 3 inches to approximately about 11 inches, with a preferred length of about 4.125 inches. 'Y' denotes the lower length of handgrip-portion 18, that may be designed in the range of approximately about 3 inches to approximately about 11 inches, with a preferred length of about 5 inches. FIG. 14 shows a side view of the handlebar of FIG. 13 attached to primary handlebar 2. Primary handlebar 2 is attached to bicycle stem 1 by securing upper bracket 11 and lower bracket 12 around primary handlebar 2.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. An apparatus, comprising:
   two upper portions substantially parallel with each other and negatively sloping below and in front of a crosspiece, each one of said upper portions having a length in a range of about 3 inches to about 11 inches while forming a right angle with the crosspiece and connected on opposite sides of a center portion of the crosspiece and between a pair of primary handles, the crosspiece having one of the pair of primary handles at each end and the center portion coupled to a pivot point accommodating steering of a bicycle, the primary handles accommodating a user's hands for steering of the bicycle; and two lower portions with each one being coupled to and forming a V-shape with each one of said upper portions, said lower portions angling towards the crosspiece and away from the center portion, each one of said lower portions having a length in a range of about 3 inches to about 11 inches, said upper and lower portions being hollow tubes of thickness between about 0.02 and 0.2 inches, the pair of hands of a user being in relatively close proximity when placed on each one of said lower portions for controlling the bicycle.

2. The apparatus of claim 1, wherein said upper and lower portions being manufactured as an integral whole with the crosspiece of the bicycle.

3. The apparatus of claim 1, further comprising a bracket for attaching said upper portions to any location along the crosspiece and in between the pair of primary handles attached to each end portion of the bar.

4. The apparatus of claim 1, wherein, when viewed from the side, an angle of the V-shape formed between said upper and lower portions is in a range of about 45 degrees to about 80 degrees.

5. The apparatus of claim 4, wherein said angle is in a range of about 50 degrees to about 70 degrees.

6. The apparatus of claim 4, wherein said angle is about 63 degrees.

7. The apparatus of claim 1, wherein an acute angle formed between an intersection of a first line extending down from said upper portion and a second line parallel to said lower portion, when viewed from the front after being attached to the bicycle, is in a range of about 5 degrees to about 45 degrees.

8. The apparatus of claim 7, wherein said acute angle is about 25 degrees.

9. The apparatus of claim 8, wherein said upper portion forming an angle with a plane intersecting the crosspiece of the bicycle and parallel to a ground, when viewed from the side after said apparatus is attached to the bicycle, of about 29 degrees.

10. The apparatus of claim 1, wherein said upper portion forming an angle with a plane intersecting the crosspiece of the bicycle and parallel to a ground, when viewed from the side after said apparatus is attached to the bicycle, in a range of about 5 degrees to about 45 degrees.

11. The apparatus of claim 1, further comprised by each one of said upper portions being rotatable about a center axis of said upper portion and being extendable.

12. An apparatus comprising:
    a stem rotatable controlling a front wheel of a bicycle;
    a crosspiece having a center portion attached perpendicularly to said stem;
    a pair of primary handles each attached at one end of said crosspiece; and
    a pair of secondary handles each one having an upper portion and a lower portion, two said upper portions substantially parallel with each other and each one forming a right angle with said crosspiece, each one of said upper portions connected on opposite sides of a center of said crosspiece and between said pair of primary handles, each one of said upper portions forming a downward slope below and in front of said crosspiece, two said lower portions with each lower portion being coupled to and forming a V-shape with each one of said upper portions, said lower portions angling towards said crosspiece and away from the center portion of said crosspiece, a manual manipulation of said secondary handles has a corresponding movement of said stem allowing for steering of the bicycle.

13. The apparatus of claim 12, wherein, when viewed from the side, an angle of the V-shape formed between said upper and lower portions is in a range of about 45 degrees to about 80 degrees.

14. The apparatus of claim 13, wherein said angle is in a range of about 50 degrees to about 70 degrees.

15. The apparatus of claim 13, wherein said angle is about 63 degrees.

16. The apparatus of claim 15, further comprised by each one of said pair of secondary handles being rotatable about a center axis of said upper portion and each one having an extendable upper portion.

17. The apparatus of claim 12, wherein an acute angle formed between an intersection of a first line extending down from said upper portion and a second line parallel to said lower portion, when viewed from the front after being attached to the bicycle, is in a range of about 5 degrees to about 45 degrees.

18. The apparatus of claim 17, wherein said acute angle is about 25 degrees.

19. An apparatus comprising:
 a bar controlling the movement of a bicycle with a primary handle at each end; and
 a pair of secondary handles with each one having an upper portion and a lower portion, two said upper portions substantially parallel with each other, each one of said upper portions connected on opposite sides equidistant from a center of said bar and between said primary handles, each one of said upper portions forming a downward slope in front of and below said bar, each one of said upper portions forming a right angle with said bar, each one of said lower portions being coupled to and forming a V-shape with each one of said upper portions, said lower portions angling towards said bar and away from the center of said bar, a manual manipulation of said secondary handles has a corresponding movement of said bar, a user manually manipulates said secondary handles by placing each one of a pair of hands on each one of said lower portions while the arms of the user being below the bar, said secondary handles being rotatable about a center axis of said upper portion and each having an extendable upper portion.

20. The apparatus of claim 19, wherein said upper portion forming an angle with a plane intersecting said bar of the bicycle and parallel to a ground, when viewed from the side after said secondary handles are attached to the bicycle, of about 29 degrees.

21. The apparatus of claim 20, wherein, when viewed from the side, an angle of the V-shape formed between said upper and lower portions of said secondary handles is about 63 degrees and an acute angle formed between an intersection of a first line extending down from said upper portion and a second line parallel to said lower portion of said secondary handle, when viewed from the front after being attached to said bar, is about 25 degrees.

22. The apparatus of claim 21, further comprising:
 a bracket attached to an end of said upper portion;
 a second tube attached to said bracket and positioned inside said upper portion;
 a threaded stem rotatable mounted inside said second tube and having a first end engaged with said bracket; and
 an enlarged portion attached to a second end of said threaded stem.

23. A method, comprising the steps of:
 attaching two primary handles to both ends of a bar, a movement of said bar about a center point steering a bicycle;
 coupling a lower portion of each one of two secondary handles with an upper portion forming a V-shape;
 attaching two secondary handles to said bar on opposite sides of said bar between said two primary handles and forming a downward slope of said upper portion below and away from said bar, said upper portions forming a right angle with said bar; and
 angling said lower portions towards said bar and away from a center of said bar.

24. The method of claim 23, wherein an angle of the V-shape formed between said upper and lower portions of said secondary handles is about 63 degrees when viewed from the side and an acute angle formed between an intersection of a first line extending down from said upper portion and a second line parallel to said lower portion of said secondary handle, when viewed from the front after being attached to said bar, is about 25 degrees.

25. An apparatus, comprising:
 a bar having a primary handle on one end and steering a bicycle by pivoting on a center of said bar; and
 a secondary handle having an upper portion and a lower portion, said upper portion forming a right angle with said bar, said upper portion connected between the center of said bar and said primary handle, said upper portion being in front of said bar, said lower portion being coupled to said upper portion, said lower portion angling towards said bar and away from the center of said bar.

26. The apparatus of claim 25, with said lower portion forming a substantially U-shape with said upper portion.

27. The apparatus of claim 25, further comprising said upper portion being rotatable about a center axis of said upper portion and being extendable.

28. The apparatus of claim 25, further comprising a bracket attaching said upper portion to any location along said bar between the primary handle and the center.

29. The apparatus of claim 25, with said upper and lower portions being manufactured as an integral whole with said bar of the bicycle.

30. The apparatus of claim 25, further comprising:
 a bracket attached to an end of said upper portion;
 a second tube attached to said bracket and positioned inside said upper portion;
 a threaded stem rotatably mounted inside said second tube and having a first end engaged with said bracket; and
 an enlarged portion attached to a second end of said threaded stem.

31. The apparatus of claim 25, with an angle between said upper and lower portions, when viewed from the side, being in a range of about 45 degrees to about 80 degrees.

32. The apparatus of claim 31, with said angle being in a range of about 50 degrees to about 70 degrees.

33. The apparatus of claim 32, with said angle being about 63 degrees.

34. The apparatus of claim 25, further comprising an acute angle formed between an intersection of a first line extending down from said upper portion and a second line parallel to said lower portion, when viewed from the front after being attached to the bicycle, being in a range of about 5 degrees to about 45 degrees.

35. The apparatus of claim 34, with said acute angle being about 25 degrees.

36. The apparatus of claim 25, with said upper portion forming an angle with a plane intersecting the bar of the bicycle and parallel to a ground, when viewed from the side after side apparatus being attached to the bicycle, in a range of about 5 degrees to about 45 degrees.

37. The apparatus of claim 25, with said upper portion forming an angle with a plane intersecting the bar of the bicycle and parallel to a ground, when viewed from the side after said apparatus being attached to the bicycle, of approximately 29 degrees.

38. The apparatus of claim 25, further comprising another secondary handle formed equidistant on the other side of the center of said bar.

39. The apparatus of claim 25, with said lower portion forming a substantially V-shape with said upper portion.

40. The apparatus of claim 25, with said upper portion forming a downward slope below said bar.

41. An apparatus, comprising:
a stem rotatably controlling a front wheel of a bicycle;
a crosspiece having a center portion attached perpendicularly to said stem;
a primary handle attached at one end of said crosspiece; and
a secondary handle having an upper portion and a lower portion, said upper portion forming a right angle with said crosspiece, said upper portion connected between a center of said crosspiece and said primary handle, said upper portion forming a downward slope below and in front of said crosspiece, said lower portion being coupled to said upper portion, said lower portion angling towards said crosspiece and away from the center portion of said crosspiece, a manual manipulation of said secondary handle having a corresponding movement of said stem accommodating steering of the bicycle.

42. The apparatus of claim 41, with said lower portion forming a U-shape with said upper portion.

43. The apparatus of claim 42, with an angle of the U-shape formed between said upper and lower portions, when viewed from the side, being in a range of about 45 degrees to about 80 degrees.

44. The apparatus of claim 43, with said angle being in a range of about 50 degrees to about 70 degrees.

45. The apparatus of claim 44, with said angle being about 63 degrees.

46. The apparatus of claim 43, further comprising an acute angle formed between an intersection of a first line extending down from said upper portion and a second line parallel to said lower portion, when viewed from the front after being attached to the bicycle, being in a range of about 5 degrees to about 45 degrees.

47. The apparatus of claim 46, with said acute angle being about 25 degrees.

48. The apparatus of claim 46, with said upper portion forming an angle with a plane intersecting the crosspiece of the bicycle and parallel to a ground, when viewed from the side after said apparatus being attached to the bicycle, in a range of about 5 degrees to about 45 degrees.

49. The apparatus of claim 48, further comprising said secondary handle being rotatable about a center axis of said upper portion and having an extendable upper portion.

50. The apparatus of claim 42, with said upper portion forming an angle with a plane intersecting the crosspiece of the bicycle and parallel to a ground, when viewed from the side after said apparatus being attached to the bicycle, of approximately 29 degrees.

51. The apparatus of claim 41, with said lower portion forming a substantially V-shape with said upper portion.

52. An apparatus, comprising:
a bar steering a bicycle with a primary handle at each end; said bar pivoting on a center portion; and
a pair of secondary handles with each one having an upper portion and a lower portion, two said upper portions substantially parallel with each other, each one of said upper portions connected on opposite sides equidistant from the center portion of said bar and between said primary handles, each one of said upper portions forming a downward slope in front of and below said bar, each one of said upper portions forming a right angle with said bar, each one of said lower portions being coupled to and forming a substantially U-shape with each one of said upper portions, said lower portions angling towards said bar and away from the center portion of said bar, a manual manipulation of said secondary handles having a corresponding movement of said bar, a user manually manipulating said secondary handles by placing each one of a pair of hands on each one of said lower portions and the arms of the user being below the bar, said secondary handles being rotatable about a center axis of said upper portions and each having an extendable upper portion.

53. The apparatus of claim 52, further comprising a bracket attaching each one of said upper portions to any locations along said bar between one of the primary handles and the center portion.

54. An apparatus, comprising:
a bar steering a bicycle by pivoting on a center portion, said bar having a primary handle attached at one end of said bar; and
a secondary handle having an upper portion and a lower portion, said upper portion connected between the center portion of said bar and said primary handle, said lower portion being coupled to and forming a V-shape with said upper portion.

55. The apparatus of claim 54, with said lower portion angling away from the center portion of said bar.

56. A method, comprising the steps of:
attaching two primary handles to both ends of a bar, a movement of said bar about a center point steering a bicycle;
coupling a lower portion of each one of two secondary handles with an upper portion;
attaching said two secondary handles to said bar on opposite sides of said bar between said two primary handles and forming a downward slope of said upper portion below and away from said bar, said upper portions forming a right angle with said bar; and
angling said lower portions toward said bar and away from the center point of said bar.

57. The method of claim 56, with said lower portion forming approximately a U-shape with said upper portion.

58. The method of claim 57, with an angle of the U-shape formed between said upper and lower portions of said secondary handles being in a range of approximately 45 degrees to approximately 80 degrees when viewed from the side, an acute angle formed between an intersection of a first line extending down from said upper portion and a second line parallel to said lower portion of said secondary handle, when viewed from the front after being attached to said bar, said acute angle being in a range of approximately 5 degrees to approximately 45 degrees, said upper portion forming an angle with a plane intersecting the bar of the bicycle and parallel to a ground, when viewed from the side after said apparatus being attached to the bicycle, in a range of approximately 4 degrees to approximately 45 degrees.

59. The method of claim 58, further comprising said upper portions being rotatable about a center axis of said upper portion and being extendable.

60. The method of claim 59, further comprising a bracket attaching said upper portion to any location along said bar between the primary handle and the center.

61. The method of claim 60, further comprising the steps of:

attaching said bracket to an end of said upper portion;

attaching a second tube to said bracket and positioned inside said upper portion;

mounting a threaded stem rotatably inside said second tube and having a first end engaged with said bracket; and attaching an enlarged portion to a second end of said threaded stem.

62. The method of claim 61, further comprising the step of positioning both said upper portions adjacent to the center point of said bar, said primary handles accommodating a user to have thumbs touch when steering the bicycle, the arms of the user being below said bar when steering said bicycle.

63. The method of claim 59, with said upper and lower portions being manufactured as an integral whole with said bar of the bicycle.

64. The method of claim 56, with said lower portion forming approximately a V-shape with said upper portion.

65. A method, comprising the steps of:

leaning shoulders of a user toward a front of a bicycle and away from a seat of the bicycle, a movement of a bar about a center steering the bicycle;

placing arms of the user below said bar of the bicycle, said bar having two primary handles on both ends of said bar, said two primary handles used to steer said bicycle;

positioning a hand of a user on each lower portion of two secondary handles;

holding both lower portions of each one of said two secondary handles, said secondary handles having said lower portion coupled to an upper portion, said upper portion attached to said bar of the bicycle, said two secondary handles located in between said two primary handles, said upper portion forming a right angle with said bar, said lower portion angling said lower portion toward said bar and away from a center of said bar; and steering the bicycle with said secondary handles, wrists of the user being bent away from the center of said bar accommodating control of the bicycle.

66. The method of claim 65, further comprising the step of positioning both said upper portions adjacent to the center of said bar, said primary handles accommodating a user to have thumbs touch when steering the bicycle, the proximity toward the center of the bar accommodating a lowered exposure of the user to wind.

67. The method of claim 66, with said lower portion forming approximately a U-shape with said upper portion.

68. The method of claim 66, with said lower portion forming approximately a V-shape with said upper portion.

* * * * *